United States Patent
Lansinger

[11] Patent Number: 5,957,384
[45] Date of Patent: Sep. 28, 1999

[54] WINDSHIELD HEATED WIPING SYSTEM

[76] Inventor: Jere Rask Lansinger, 2182 Lost Tree Way, Bloomfield Hills, Mich. 48304

[21] Appl. No.: 08/918,445

[22] Filed: Aug. 26, 1997

[51] Int. Cl.[6] ....................................................... B05B 1/10
[52] U.S. Cl. ........................ 239/284.1; 239/135; 219/202; 392/485; 392/488
[58] Field of Search ..................................... 239/130, 135, 239/284.1; 137/98; 15/250.05; 219/202; 392/485, 488, 489, 491, 492, 478, 479

[56] References Cited

U.S. PATENT DOCUMENTS

| | | |
|---|---|---|
| 1,153,095 | 9/1915 | Martin . |
| 1,228,482 | 6/1917 | Schonger . |
| 1,410,487 | 3/1922 | McCarty . |
| 1,465,292 | 8/1923 | Wessig . |
| 1,490,168 | 4/1924 | Ford . |
| 1,556,030 | 10/1925 | Redshaw . |
| 1,650,922 | 11/1927 | Worthington . |
| 1,733,408 | 10/1929 | Herber . |
| 1,835,833 | 12/1931 | Williams . |
| 1,917,141 | 7/1933 | Middleton . |
| 1,933,220 | 10/1933 | Petree .......................................... 219/19 |
| 2,032,998 | 3/1936 | Mickadeit ................................. 20/40.5 |
| 2,056,776 | 10/1936 | Evans et al. ............................... 20/40.5 |
| 2,125,154 | 7/1938 | Dillon ........................................ 15/250 |
| 2,258,922 | 10/1941 | Albee ........................................ 20/40.5 |
| 2,260,904 | 10/1941 | Horton ...................................... 20/40.5 |
| 2,367,426 | 1/1945 | Patterson .................................. 20/40.5 |
| 2,576,198 | 11/1951 | Stuart ........................................ 20/40.5 |
| 2,662,154 | 12/1953 | Cochran ..................................... 219/19 |
| 2,738,408 | 3/1956 | Cheviron ................................... 219/19 |
| 2,839,773 | 6/1958 | McMillen ............................... 15/250.5 |
| 2,947,020 | 8/1960 | Wilfert ................................ 15/250.16 |
| 2,968,071 | 1/1961 | Di Perna .................................. 20/40.5 |
| 3,135,004 | 6/1964 | Naigraw ................................ 15/250.01 |
| 3,243,119 | 3/1966 | Merkle ................................... 237/12.3 |
| 3,292,866 | 12/1966 | Benner ...................................... 239/284 |
| 3,319,891 | 5/1967 | Campbell ................................. 239/130 |

(List continued on next page.)

FOREIGN PATENT DOCUMENTS

| | | |
|---|---|---|
| 1194037 | 11/1959 | France . |
| 197803 | 3/1978 | Germany ............................. 239/284.1 |
| 2917183 | 4/1979 | Germany . |

*Primary Examiner*—Andres Kashnikow
*Assistant Examiner*—Jorge S. Bocanegra
*Attorney, Agent, or Firm*—Gifford, Krass, Groh, Sprinkle, Anderson & Citkowski, P.C.

[57] ABSTRACT

A windshield wiper system for an automotive vehicle is disclosed in which the windshield wiper washer fluid is heated and delivered to the windshield through the rubber wiping element. In one embodiment, the windshield wiper fluid is heated to a substantial level of temperature and pressure within a sealed reservoir by the heat from the engine coolant system. In another embodiment, a tubular electrical high intensity heating element with turbulent counter flow is used to instantly heat the windshield wiper fluid, and the heating element is automatically electrically energized in response to fluid flow through the tubular heating element. In another embodiment electrical direct current vehicle power or selectively alternating current external power is used to heat fluid to a substantial level of temperature and pressure within a sealed insulated reservoir. A novel windshield wiper blade is also disclosed in which the wiper blade has a longitudinally elongated fluid chamber formed along its length. The fluid chamber is closed at one end and connected to the source of the washer fluid at its other end. A plurality of longitudinally aligned slits is formed through the wiper blade to the outlet edge to uniformly dispense the heated washing fluid downstream of wipe direction, and onto the vehicle windshield while one or more openings are also formed in the wiper blade to direct a portion of the heated washing fluid to the joints in the wiper support frame to remove ice binding the wiper frame flex joints. Additionally, the dual configuration of the blade edge is such that the second edge pair wears out sequentially to the first edge pair effectively doubling the clean wiping life of the blade.

24 Claims, 6 Drawing Sheets

U.S. PATENT DOCUMENTS

| | | | |
|---|---|---|---|
| 3,321,792 | 5/1967 | Senkewich | 15/250.04 |
| 3,366,336 | 1/1968 | Neuschwanger et al. | 239/129 |
| 3,371,368 | 3/1968 | Walker | 15/250.04 |
| 3,408,678 | 11/1968 | Linker | 15/250.05 |
| 3,416,428 | 12/1968 | Heller | 98/2 |
| 3,427,675 | 2/1969 | Tibbet | 15/250.04 |
| 3,447,186 | 6/1969 | Senkewich | 15/250.04 |
| 3,489,884 | 1/1970 | Waseleski, Jr. | 219/522 |
| 3,560,706 | 2/1971 | Fonseca | 137/341 |
| 3,574,881 | 4/1971 | Temple | 15/250.04 |
| 3,591,887 | 7/1971 | Keddie | 15/250.02 |
| 3,632,042 | 1/1972 | Goulish | 239/130 |
| 3,688,081 | 8/1972 | Speich | 219/203 |
| 3,738,252 | 6/1973 | Cardinale | 98/2.1 |
| 3,756,510 | 9/1973 | Nitteri et al. | 239/129 |
| 3,757,088 | 9/1973 | Osborn | 219/553 |
| 3,835,294 | 9/1974 | Krohn et al. | 239/135 |
| 3,868,492 | 2/1975 | Taylor | 219/203 |
| 3,888,412 | 6/1975 | Lindo | 237/12.3 B |
| 3,935,425 | 1/1976 | Weissberger et al. | 219/228 |
| 4,037,286 | 7/1977 | Medearis et al. | 15/250.05 |
| 4,085,308 | 4/1978 | Youngquist | 137/341 |
| 4,088,269 | 5/1978 | Schlick | 239/133 |
| 4,090,668 | 5/1978 | Kochenour | 239/130 |
| 4,109,133 | 8/1978 | Hänle et al. | 219/203 |
| 4,127,763 | 11/1978 | Roselli | 219/203 |
| 4,132,881 | 1/1979 | Ciarniello et al. | 219/203 |
| 4,139,761 | 2/1979 | Obrowski | 219/308 |
| 4,145,788 | 3/1979 | Ferrarelli | 15/250.05 |
| 4,177,928 | 12/1979 | Bergkvist | 239/129 |
| 4,180,723 | 12/1979 | Szupillo | 219/541 |
| 4,212,425 | 7/1980 | Schlick | 239/133 |
| 4,236,548 | 12/1980 | Howard | 137/341 |
| 4,276,501 | 6/1981 | Fanz | 318/470 |
| 4,285,540 | 8/1981 | Harada et al. | 296/192 |
| 4,354,548 | 10/1982 | Carlsson | 165/41 |
| 4,387,290 | 6/1983 | Yasuda | 219/202 |
| 4,508,957 | 4/1985 | Rocchitelli | 219/305 |
| 4,665,351 | 5/1987 | Nyberg | 318/483 |
| 4,700,424 | 10/1987 | Hagen | 15/250.04 |
| 4,763,381 | 8/1988 | Williams | 15/250.01 |
| 4,821,363 | 4/1989 | Delluc | 15/250.05 |
| 4,832,262 | 5/1989 | Robertson | 239/129 |
| 4,862,951 | 9/1989 | Müller et al. | 165/41 |
| 4,910,380 | 3/1990 | Reiss et al. | 219/203 |
| 4,967,437 | 11/1990 | Morse | 15/250.07 |
| 5,010,289 | 4/1991 | Takada | 322/8 |
| 5,046,216 | 9/1991 | Baungarter et al. | 15/250.29 |
| 5,065,471 | 11/1991 | Laplante | 15/250.04 |
| 5,099,909 | 3/1992 | Barigelli | 165/41 |
| 5,118,040 | 6/1992 | Abe | 239/284.1 |
| 5,221,828 | 6/1993 | Basheer et al. | 219/202 |
| 5,264,962 | 11/1993 | Kho | 359/362 |
| 5,325,561 | 7/1994 | Kotlar | 15/250.06 |
| 5,327,614 | 7/1994 | Egner-Walter et al. | 15/250.04 |
| 5,354,965 | 10/1994 | Lee | 219/202 |
| 5,383,247 | 1/1995 | Nickel | 15/250.04 |
| 5,509,606 | 4/1996 | Breithaupt et al. | 239/130 |
| 5,522,453 | 6/1996 | Green | 165/41 |

WINDSHIELD HEATED WIPING SYSTEM

BACKGROUND OF THE INVENTION

I. Field of the Invention

The present invention relates generally to windshield wiping systems and, more particularly, to a windshield wiping system utilizing heated windshield washing fluid.

II. Description of the Prior Art

In a typical windshield wiper system of the type used in automotive vehicles, the windshield wiper fluid is pumped from a reservoir of washing fluid to one or more nozzles having their output directed onto the windshield. In some cases, the nozzles themselves are carried by the wiper arms which carry the wiper blade or even alternatively by the blades themselves.

A disadvantage of these previously known wiper systems is that, in cold climates, ice accumulation on the windshield, wiper blades and nozzle openings is a common occurrence making driving hazardous and unpleasant due to the resulting poor visibility through the windshield. Such ice accumulation forms over a period of time so that the washer fluid in the reservoir approaches the cold outside ambient temperature. Consequently, since the washer fluid itself is at a very cold temperature, it is not possible to effectively melt the ice on the nozzles, blades and windshield by using only the wiper fluid. Instead, the ice must be manually scraped from the windshield and knocked off the wiper blades, and in the case of frozen nozzles, the washer/wiper system can be rendered useless for a period of time amounting to days.

There have, however, been previously known windshield wiper systems utilizing heated washer fluid. These previously known systems utilize engine heat or alternatively an electrical heater to heat the windshield washing fluid. The heated washing fluid is then used to melt the ice from the windshield.

These previously known windshield wiping systems utilizing heated washing fluid, however, have not proven satisfactory in operation and have not achieved acceptance in the industry for reasons generally including excessive cost and complexity, inadequate heating, nozzle freeze up and ineffective delivery to critical locations needing deicing.

More specifically, one reason that the previously known heated windshield wiper systems which employ engine heat to heat the washing fluid have not proven satisfactory is that the washer fluid delivered to the windshield was ineffectively heated. When this happened, the windshield washing fluid, being only moderately heated, only marginally facilitated the melting of the ice from the vehicle windshield and further resulted in using too much fluid thus, the limited capacity reservoir was quickly emptied.

The previously known windshield wiping systems utilizing electric heaters have likewise not proven satisfactory in operation. One disadvantage of these previously known systems is that the heating element did not effectively heat the windshield washing fluid so that the resulting moderately heated washing fluid only moderately facilitated the melting of the ice from the windshield and again, excessive fluid was used quickly emptying the reservoir. Attempts to use higher output heating elements have resulted in failed heating elements, boiling and purging of the washing fluid with its depressed boiling point from alcohol, and other undesirable operating characteristics.

A still further disadvantage of these previously known systems is that the ice accumulation occurs not only on the windshield but also upon the flexible bridging frame that supports the rubber wiping element. When this occurs, the frame cannot flex in its normal fashion in order to maintain the wiper blade in contact with the windshield throughout the stroke of the wiper arm. This results in non-cleaning of the windshield which continues until the bridging frame flex joints for the wiper blade are free of ice.

Lack of very uniform distribution and melt time of the heated fluid on the critical vision area of the windshield before being swept off has limited effectiveness of previously known systems.

Short clean wiping life has universally been a problem with previously known wiper blades.

SUMMARY OF THE PRESENT INVENTION

The present invention provides a windshield cleaning system which overcomes all of the above-mentioned disadvantages of the previously known devices.

In brief, in one embodiment of the present invention, the cleaning system includes a fluid nozzle having an outlet directed towards the windshield, a source of windshield cleaning fluid and a pump for pumping the windshield cleaning fluid from its source and to the nozzle.

A housing defining a fluid chamber is fluidly disposed in series between the source of cleaning fluid and the fluid nozzle. A piston is disposed in the fluid chamber and has an outer and inner periphery, both in sealing contact with the housing with seals configured to allow only forward flow with adequate differential pressure. The piston also divides the housing and fluid chamber into an inlet chamber fluidly connected to the source of cleaning fluid and an outlet chamber fluidly connected to the nozzle. The outlet chamber exit is normally closed by a fluid pressure responsive stem valve. The piston, furthermore, is movable between a first position and a second position while a helical compression spring resiliently urges the piston towards its first position. Additionally, an annular chamber is provided around the fluid chamber and this annular chamber is connected with the cooling system fluid for the internal combustion engine. Consequently, heat from the coolant of the engine cooling system heats the fluid sealingly contained to substantially elevated, yet controlled, temperature and pressure within the outlet chamber. The inlet chamber is additionally heated by the engine heat.

Upon activation of the windshield wiper / washer system, the pump fluidly pumps the cleaning fluid from the source and into the inlet chamber of the housing. In doing so, the influent to the inlet chamber releases outlet chamber pressure by opening the stem valve permitting forward flow, and moves the piston from its first and towards its second position and, in doing so, pumps fluid out from the outlet chamber, to the nozzle and ultimately to the windshield. Since the heated fluid in the outlet chamber is not intermixed with cold incoming fluid, only thoroughly heated fluid is provided to the nozzle as the piston moves from its first into its second position.

In order to enable continued operation, if ever required, of the windshield cleaning system once all the fluid has been pumped from the outlet chamber to the nozzle, when the piston reaches its second position, greater differential pressure causes the seals to open between the periphery of the piston and the housing. This opening establishes fluid communication between the inlet chamber and outlet chamber thus enabling continued operation of the windshield wiping system, albeit with moderately heated windshield cleaning fluid.

The piston furthermore is configured as an insulated pressure responsive flex plate. Excessive outlet chamber pressure is avoided by the stem valve also acting as a pressure relief valve as will happen by the flex plate configured piston urging the outer stem valve connected flex plate upward thereby opening the stem valve and relieving excess pressure as might happen on a very hot day or with a failed cooling system. Furthermore, the insulation of the flex plate prevents excessive heating and boiling away of inlet chamber fluid, as well as minimizing heat transfer from the outlet chamber to the inlet chamber or during pumping.

In a second embodiment of the invention, a tubular and cylindrical high output electrical heating element is employed to heat the windshield cleaning fluid. The tubular heating element is fluidly connected in series between the source of cleaning fluid and the nozzle so that all of the cleaning fluid pumped from the source through the nozzle passes through the interior of the heating element with forced turbulent flow, then counter flows with forced turbulence on the outer surface of the heating element. This turbulent counter flow limits heating element maximum temperature and protects against element burnout, as would otherwise occur with laminar flow and full film boiling at the element. When the heating element is electrically powered with high current, the heating element thus rapidly heats the fluid before the fluid reaches the nozzle. With modern high output batteries and generators the required high current draw is feasible without excessively draining the battery. Furthermore, excessive battery drain protection is provided by a flow sensing piston actuated switch calibrated to turn off at a lower flow level corresponding to the decreased output of the electric washer fluid pump as would happen with decreasing battery voltage with prolonged operation of the high intensity heating element.

The flow responsive piston arrangement is also provided to automatically activate the electrical heating element only in response to fluid flow through the heating element zone. This flow responsive piston assembly thus additionally prevents possible burnout of the heating element in the event of blockage of the fluid system.

Although a conventional nozzle may be employed to dispense the heated cleaning fluid against the windshield, the system preferably includes an elongated resilient windshield wiper having a longitudinally elongated fluid chamber formed along its length. One end of the fluid chamber is closed while the opposite end of the fluid chamber in the wiper is connected to the pressurized source of cleaning fluid.

The wiper includes a blade which contacts the surface of the windshield. A plurality of longitudinally aligned resiliently opening and closing slits activated by fluid pressure is formed through the wiper blade which fluidly connects the fluid chamber contained in the wiper to the wiping edge of the wiper blade and thus to the windshield. This enables high temperature fluid to be safely dispersed very uniformly and downstream of wipe direction and without danger of scalding or cracking the windshield from thermal shock.

The elastomer wiper blade itself is supported by a support bridging frame structure having at least one pivotal connection flex joint to facilitate continuous contact of the wiper blade to the curved surface windshield throughout the travel of the wiper assembly. In order to prevent freezing of the joints of the bridging frame and thus insufficient contact between the wiper blade and the windshield, at least one opening is formed through the wiper opposite from the blade wiping edge. This opening fluidly communicates with the fluid chamber contained within the wiper so that pressurized heated cleaning fluid is directed towards the flex joint in the support frame to thus melt any ice accumulation which occurs on the critical points of the blade support frame.

Furthermore, the full blade length exit slit of the rubber blade edge is proportioned such that two pairs of wiping edges are formed, which wear in sequence thus effectively doubling clean wiping life of the rubber blade.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figures 1, 8:
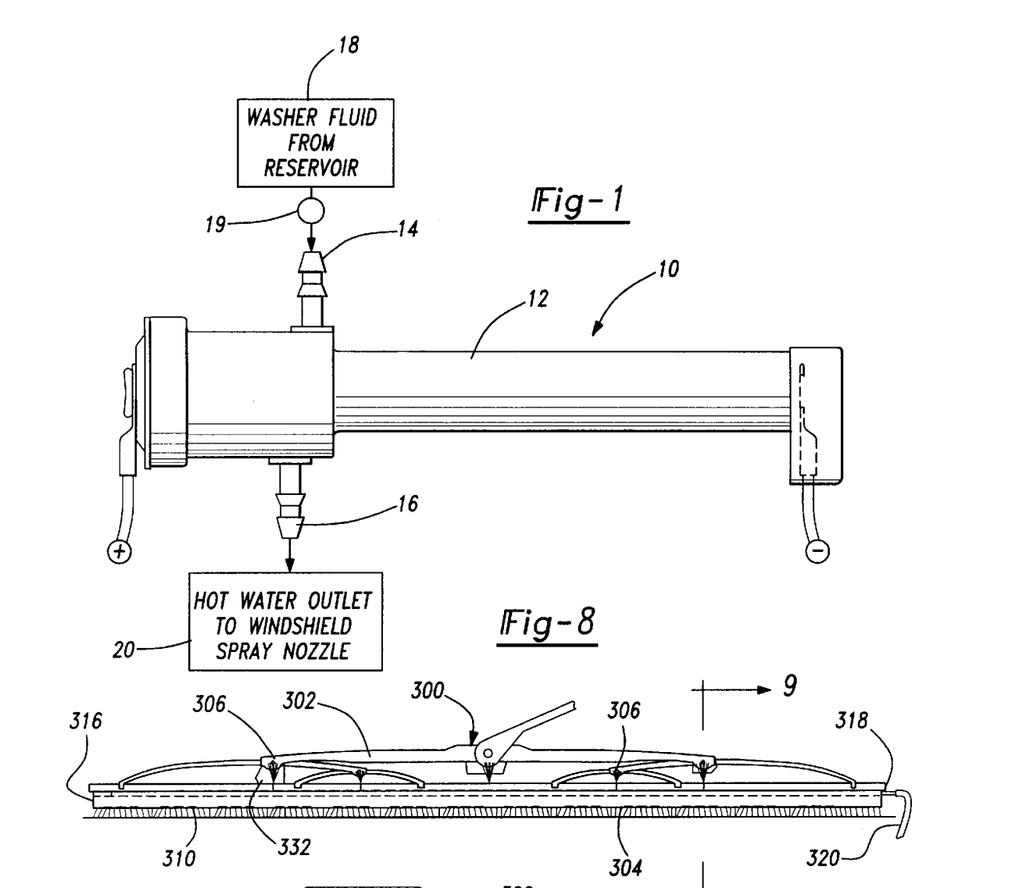
FIG. 1 is a side view illustrating a first preferred embodiment of the present invention.
FIG. 8 is a view illustrating a preferred wiper of the present invention.
Figure 2:
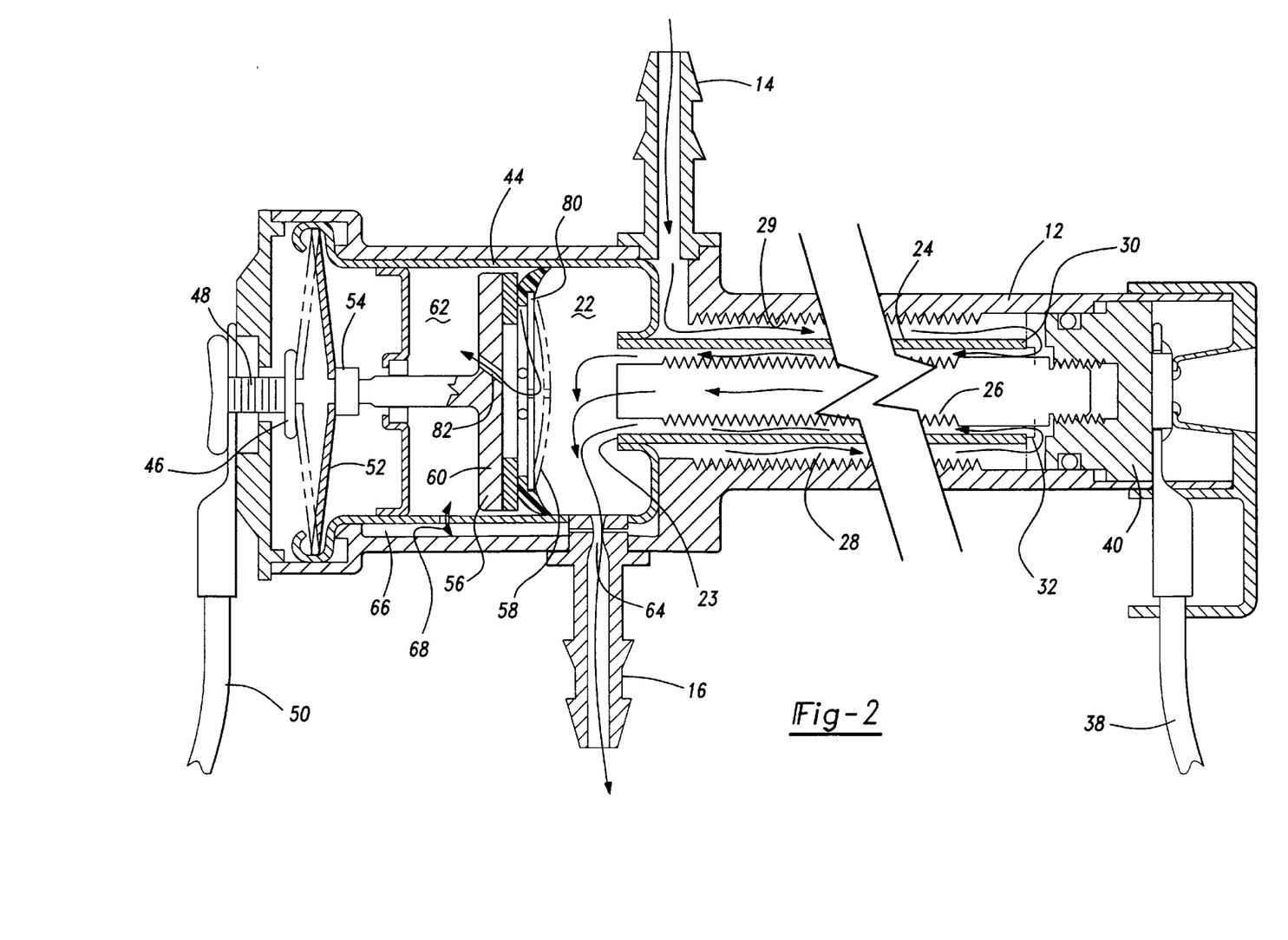
FIG. 2 is a longitudinal sectional view illustrating the first preferred embodiment of the present invention.

With reference first to FIGS. 1 and 2, a first preferred embodiment of a washer fluid heating system 10 for a windshield wiping system of the type used in automotive vehicles is there shown. The heating system 10 includes an elongated housing 12 having an inlet fluid port 14 and an outlet fluid port 16. The inlet fluid port 14 receives pressurized cleaning fluid from a windshield washer cleaning fluid reservoir 18 and pump 19 while the outlet port 16 is fluidly connected to a spray nozzle 20 (illustrated only diagrammatically) for the automotive vehicle.

With reference now particularly to FIG. 2, an elongated tubular and cylindrical heating element 24 which can be constructed of any conventional electrical heating material, such as NiChrome is coaxially disposed in the housing 12. A turbulator 26 is coaxially disposed within the heating element 24 so that fluid flow through the interior of the heating element 24 is turbulent thus increasing the contact between the fluid and heating element 24 and thus increasing the transfer of heat from the heating element 24 and to the fluid.

Still referring to FIG. 2, the housing 12 forms an annular chamber 28 around the outer surface of the heating element 24 and this annular chamber 28 is fluidly connected to the interior of the heating element 24 by fluid passageway 32 adjacent a second end 30 of the heating element 24 as well as to the inlet 14. This annular chamber 28 also communicates with the outlet port 16 via the interior of the heating element 24 and an outlet chamber 22 open to one end 23 of the heating element 24. Consequently, fluid flow into the inlet port 14 flows through the chamber 28 exterior of the heating element 24, through the passageway 32 and then through the interior of the heating element 24 to the chamber 22 and outlet port 16. In doing so, and assuming that the heating element 24 is electrically energized, heat is transferred from the heating element 24 to the fluid flow through the housing 12. A turbulator surface 29 is also preferably formed in the housing 12 around the outer annular passageway 28.

In order to provide electrical power to the heating element 24 to energize it, a first electrical connector 38 is electrically connected via a metal boss 40 to the end 30 of the heating element 24. The opposite end 23 of the heating element 24 is selectively electrically connected via a metal support member 44 and diaphragm operated switch 46 (described more fully below) to a second electrical connector 48 which is electrically connected by a cable 50 to the opposite electrical pole.

Still referring to FIG. 2, the diaphragm switch 46 includes an electrically conductive, belleville washer diaphragm 52 which is movable between an electrically open position, illustrated in solid line in FIG. 2, and a closed position, illustrated in phantom line in FIG. 2. In its open position, actuator rod 54 of the diaphragm switch 46 is spaced from electrical connector 48, while in its closed position the rod 54 causes the electrically conductive diaphragm to contact connector 48 thus completing the electrical circuit between the connector 48 through the diaphragm 52, support member 44 and to the end 23 of the heating element 24.

In order to move the actuator 54 between its open position and closed position, a piston 56 is mechanically connected to the actuator 54 and disposed within the chamber 22. Thus, one side 58 of the piston 56 is exposed to the pressure within the chamber 22 while the opposite side 60 of the piston is exposed to a pressure in a subchamber 62. The subchamber 62 fluidly communicates with the outlet port 16 via a fluid port 68, fluid passageway 66 and a venturi 64.

The piston 56 thus senses fluid flow through the outlet port 16 since such fluid flow will cause a reduced pressure in the subchamber 62 by the venturi 64 in combination with the increased pressure in the chamber 22. Such a condition will cause the piston to shift the diaphragm switch to its closed position thus energizing the heating element 24.

The system may also include a thermostatic snap disc 80 which, in response to fluid temperature, snaps between the closed position, shown in solid line, and an open position, illustrated, in phantom line. In its open position, the snap disc 80 opens a fluid passageway 82 formed through the piston 56 to equalize the pressure on both sides of the piston 56, thus protecting the heating element 24 from burnout.

Conversely, in the event that the fluid passageway from the reservoir 18 to the nozzle 20 (FIG. 1) is blocked, for example by a freeze in the fluid lines, it is important that the heating element 24 not be energized since such energization can cause a burnout of the heating element. In this event, fluid pressure through the inlet port 14 to the chamber 22 will also be communicated, without pressure reduction, to the subchamber 62. In doing so, with the inadequate pressure differential between both sides of the piston, the diaphragm switch will remain in its open position due to the resiliency of the diaphragm 52. Energization of the heating element 24 will thus not occur until, of course, the blockage of the fluid system is removed.

Figure 5:
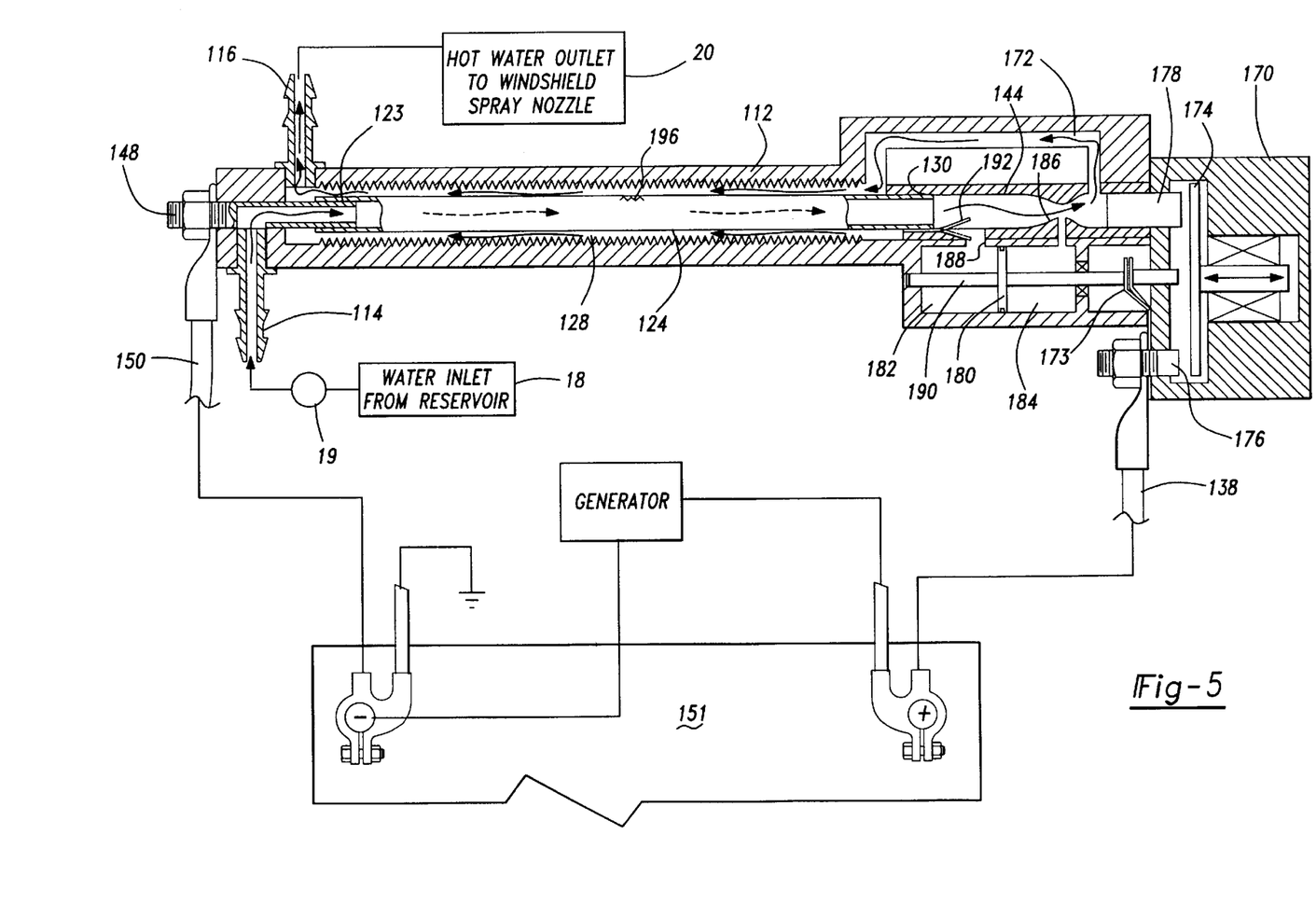
FIG. 5 is a longitudinal sectional view illustrating a third preferred embodiment of the present invention.

With reference now to FIG. 5, a second preferred embodiment of the present invention is there shown. Like the first preferred embodiment, the second preferred embodiment includes an elongated housing 112 having an inlet port 114 and an outlet port 116. As before, the inlet port 114 is connected to the reservoir 18 and pump 19 while the outlet port 116 is connected to the spray nozzle 20.

An elongated tubular and cylindrical heating element 124 is disposed within the interior of the housing 112 and has one end 123 electrically connected by terminal 148 and cable 150 to a first electrical pole of a power supply 151. Conversely, the opposite end 130 of the heating element is selectively electrically connected to the opposite electrical pole by an electrical cable 138 and solenoid operated switch 170 which will be subsequently described in greater detail.

The electrical heating element 124 is mounted within the housing 112 so that the interior of the heating element 124 is open at its end 123 to the inlet port 114. As such, fluid flows from the inlet port 114 flows into the end 123, through the heating element 124 and to the end 130 of the heating element 124. A fluid passageway 172 formed in the housing 112 fluidly connects the end 130 of the heating element 124 to an annular chamber 128 so that fluid flow flows along the exterior of the heating element 124 and to the outlet port 116 which is positioned adjacent the end 123 of the heating element 124. Consequently, fluid flow through the heating element 124 passes not only through the interior of the heating element 124 but then along the exterior of the heating element 124 thereby efficiently transferring heat from the heating element 124 to the fluid.

Still referring to FIG. 5, an electrical switch 173 which is movable between an open position, and a closed position, to selectively energize the solenoid switch 170. When the switch 173 is closed, electrical power is provided through the switch 173 to the solenoid 170 which moves a solenoid plate 174 against two electrical contacts 176 and 178 thus providing an electrical connection from the cable 138 to the electric contact 178. The electric contact 178 is then electrically connected by the support housing 144 to the end 130 of the heating element 124.

In order to move the switch 173 between its open and closed position, a piston 180 is mounted within a fluid chamber in the housing 112 and thus defines two subchambers 182 and 184. A venturi 186 is fluidly connected to the subchamber 184 while, similarly, a fluid port 188 fluidly connects the interior of the heating element 124 to the subchamber 182.

In operation, fluid flow through the interior of the heating element 124 passes across the venturi 186 thus creating a reduced pressure in the subchamber 184 and, simultaneously, an increased pressure in the subchamber 182. The differential pressure between the subchambers 182 and 184 shifts the piston 180 with its attached piston rod 190 against the switch 173 thus closing the switch 173 and activating the solenoid switch 170. Conversely, in the event that a blockage exists between the reservoir 18 and nozzle 20, the fluid pressures in the subchambers 182 and 184 are substantially the same so that the spring pressure of the switch 173 retains the switch 173 in its open position thus preventing energization of the heating element 124.

In some situations, for example during warm weather operation, it is desirable to retain the switch 173 in its open position regardless of flow through the heating element 124. In order to achieve this, a bimetallic strip 192 is provided adjacent the port 188 and movable between the hot weather operating condition, illustrated in solid line, and the cold weather operating condition, illustrated in phantom line. In the hot weather operating condition, the bimetallic strip 192 creates a venturi across the port 188 which reduces the pressure in the subchamber 182. This reduction in the pressure in the subchamber 182 retains the switch 173 in its open position.

Conversely, during a cold weather operating condition, the bimetallic strip 192 switches to the position illustrated in phantom line in which the fluid pressure from the interior of the heating element 124 is directed into the subchamber 182. In this configuration, the increased pressure in the subchamber 182 coupled with the reduced pressure in the subchamber 184 during fluid flow through the heating element 124 closes the switch 173 and energizes the heating element 124 in the previously described fashion.

In order to increase the heat transfer from the heating element 124 to the fluid, any conventional turbulator means 196 may be provided within the interior of the heating element 124 and along the annular fluid passageway 128 to increase the turbulence of the fluid flow.

Figure 7:
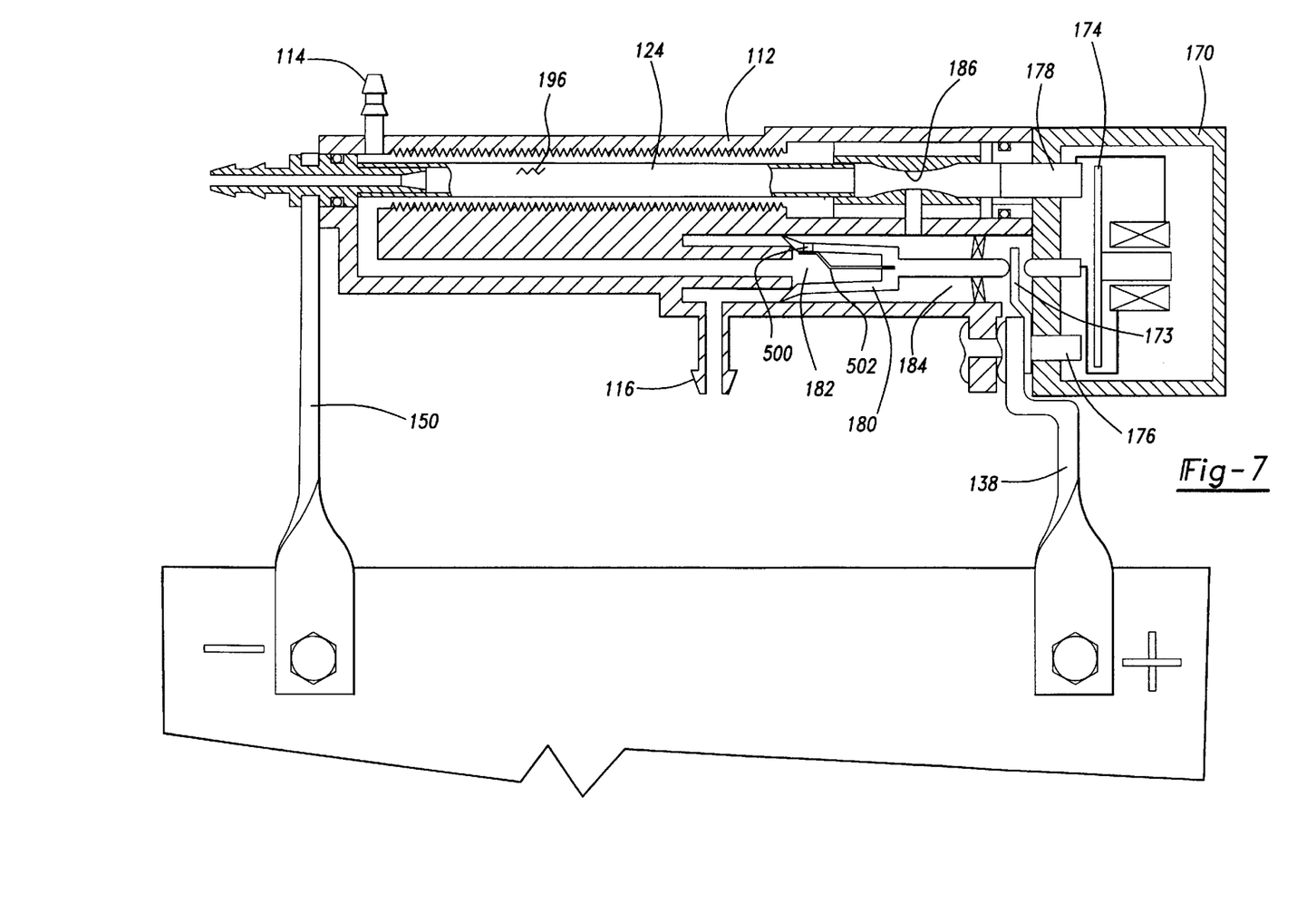
FIG. 7 is a view similar to FIG. 5 but illustrating a modification thereof.

With reference now to FIG. 7, a modification of the system illustrated in FIG. 5 is there shown in which like reference characters refer to like ports and will not be described again. In addition, the direction of fluid flow through the heating element 124 is reversed.

Still referring to FIG. 7, unlike the embodiment of FIG. 5, a port 500 is provided through the piston 180 which, when open, fluidly connects the chambers 182 and 184 together. A bimetal strip 502 is secured at one end to the piston 180 and its other end selectively closes or opens the port 500 in accordance with the fluid temperature. Thus, whenever the fluid exceeds a preset temperature threshold, the bimetal strip 502 opens the port 500 which equalizes the pressure in the chambers 182 and 184 thus opening the switch 173 and disconnecting power to the heating element 124.

From the foregoing, it can be seen that the first preferred embodiment of the invention (FIGS. 1 and 2) and the second, and third preferred embodiments of the invention (FIGS. 5 and 7) provide an effective system for electrically heating cleaning fluid of the type used in windshield wiper systems. Furthermore, both of these latter two embodiments detect a clogged system condition to disable the heating element to protect the heating element from a burnout condition.

Figure 3:
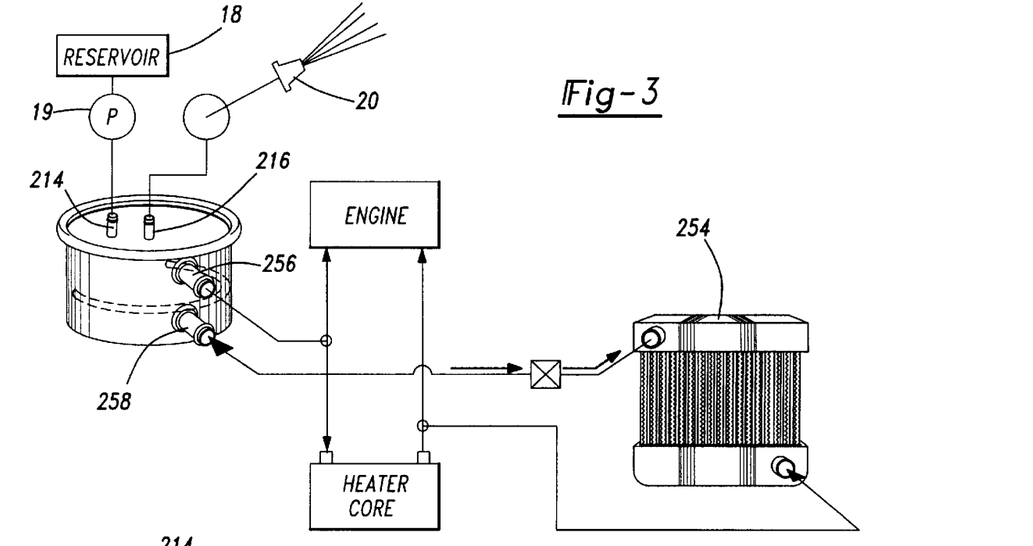
FIG. 3 is a diagrammatic view illustrating a second preferred embodiment of the present invention.

With reference now to FIG. 3 a still further preferred embodiment of the present invention is there shown in which a heater housing 212 includes both an inlet port 214 and outlet port 216. The inlet port is connected to the windshield wiper cleaning fluid reservoir 18 via the pump 19 while the outlet port 216 is connected to the nozzle 20.

Figures 4, 4A:
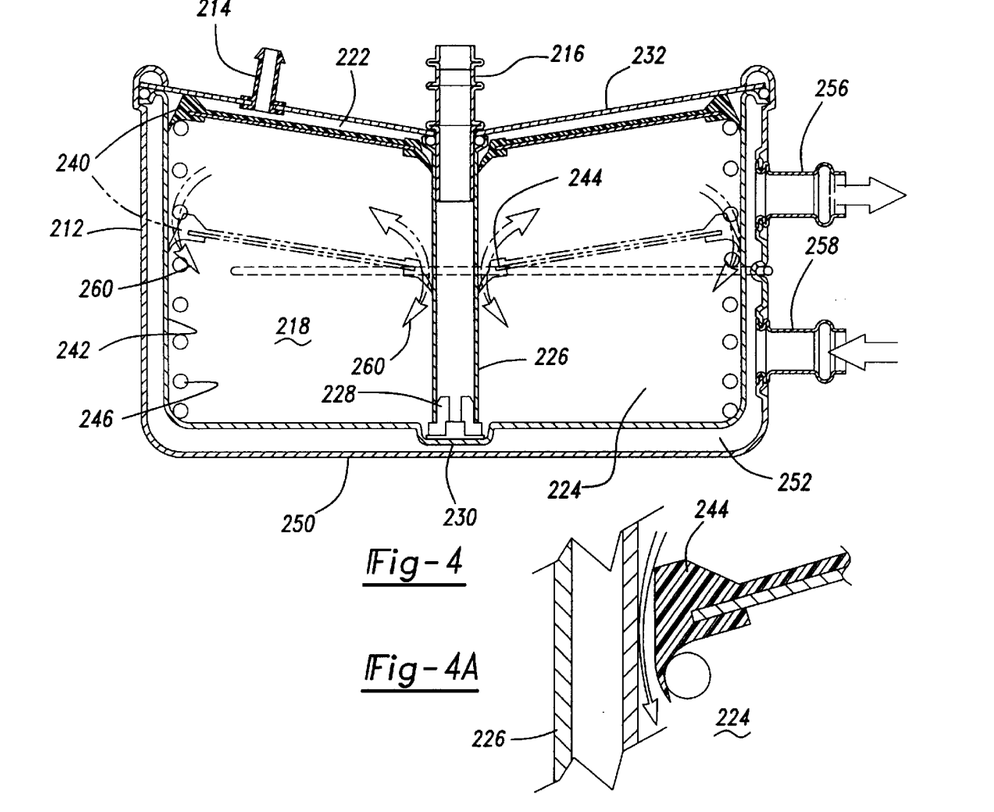
FIG. 4 is a cross-sectional view illustrating a portion of the second preferred embodiment of the present invention.
FIG. 4A is a fragmentary sectional view illustrating a portion of the second preferred embodiment of the present invention.

As best shown in FIG. 4, the housing 212 is generally cylindrical in shape thus defining an interior cylindrical chamber 218. An axially movable piston 220 is axially slidably mounted within the chamber 218 thus dividing the chamber 218 into an inlet chamber 222 and an outlet chamber 224. The inlet port 214 is directly connected to the inlet chamber 222 while the outlet chamber 224 is selectively connected to the outlet port 216 via a valve member 226.

The valve member 226 comprises an elongated tubular stem having its lower end 228 positioned over a slotted guide boss 230 at the end of the outlet chamber 224 opposite from the inlet chamber 222. The stem 226 is movable between a closed position, and an open position. In its open position, the valve stem 226 shifts axially away from the guide 228 thus establishing fluid communication from the outlet chamber 224 through the slots in the boss 230 and through the interior of the valve member 226 to the outlet port 216.

In order to move the valve stem 226 between its open and closed position, a belleville spring 232 forms one side of the inlet chamber 222 and is mechanically secured to the valve stem 226. The belleville spring 232 is movable between a nonflow position, and a flow position, in response to pressurization of the inlet chamber 222. Upon pressurization of the inlet chamber 222, the belleville spring 232 moves to the flow position (phantom line) thus shifting the valve stem 226 away from the boss 230 and permitting fluid flow from the outlet chamber 224 to the outlet port 216.

Referring now particularly to FIG. 4, an outer annular seal 240 provides a sliding sealing engagement between an inner housing 242 and the piston 220. Likewise, an annular seal member 244 provides a sliding sealing engagement between the inner periphery of the piston 220 and the valve member 226. A helical spring 246 is compressed between the bottom of the inner housing 242 and the outer periphery of the piston 220. In doing so, the helical spring 246 urges the piston towards a first position in which the piston 220 is adjacent the inlet port 214.

With reference again to FIGS. 3 and 4, in order to heat the cleaning fluid contained within the inner housing 242, the housing 212 includes an outer housing 250 which forms an annular chamber 252 around the inner housing 242. This annular chamber 252, furthermore, is fluidly connected to the cooling system fluid of the cooling system 254 (FIG. 3) by fluid connectors 256 and 258. Consequently, once the engine coolant becomes warm, the coolant flow through the chamber 252 heats the cleaning fluid to a substantially elevated temperature and pressure contained within the sealed housing chamber 218.

With reference again particularly to FIG. 4, in operation upon activation of the pump 19 (FIG. 3) the fluid flow into the inlet port 214 and inlet chamber 222 first causes the belleville spring 232 to move to its flow position thus opening the valve member 226. Continued fluid flow into the port 214 then causes the piston 220 to move downwardly towards the second position as illustrated in phantom line in FIG. 4. Furthermore, as the piston 220 moves from its first position to its second position, the piston 220 pumps fluid from the outlet chamber 224, through the valve member 226 and out through the outlet port 216 in the desired fashion. In this fashion, the piston 220, by separating the cold cleaning fluid coming from the reservoir 18 from the heated fluid in the outlet chamber 224, ensures that fully heated fluid in the outlet chamber 224 is first pumped to the windshield wiper nozzle 20.

With reference now particularly to FIG. 4A, when the piston 220 reaches its second position so that essentially all of the heated fluid has been pumped from the outlet chamber 224, activation of the pump 19 may still continue. In this event, the continuing increase of pressure in the now expanded inlet chamber 222 causes the inner seal 244 of the piston to create a small opening between the seal 244 and valve stem 226 as well as between the outer seal 240 and housing 242 thus fluidly connecting the inlet chamber 222 to the outlet chamber 224. This fluid connection, as illustrated by arrows 260, ensures continuous operation of the windshield washing fluid albeit with cooler cleaning fluid.

After the pump 19 has been deactivated following a prolonged activation of the pump 19, the helical spring 246 returns the piston 220 to its first or uppermost position as illustrated in FIG. 4. In doing so, leakage occurs from the inlet chamber 222 to the outlet chamber 224 as indicated by arrow 260 thereby refilling the outlet chamber 224 with cleaning fluid. This fluid is then heated by the coolant system fluid in the chamber 252 in the previously described fashion.

In the event of increased pressure in the chamber 218 caused, for example, by heating of the fluid, such increased pressure forces the piston 220 upwardly against the top 221 and moves the top 221 with its attached valve member 226 to an open position. In doing so, such excessive pressure is automatically relieved.

Figure 6:
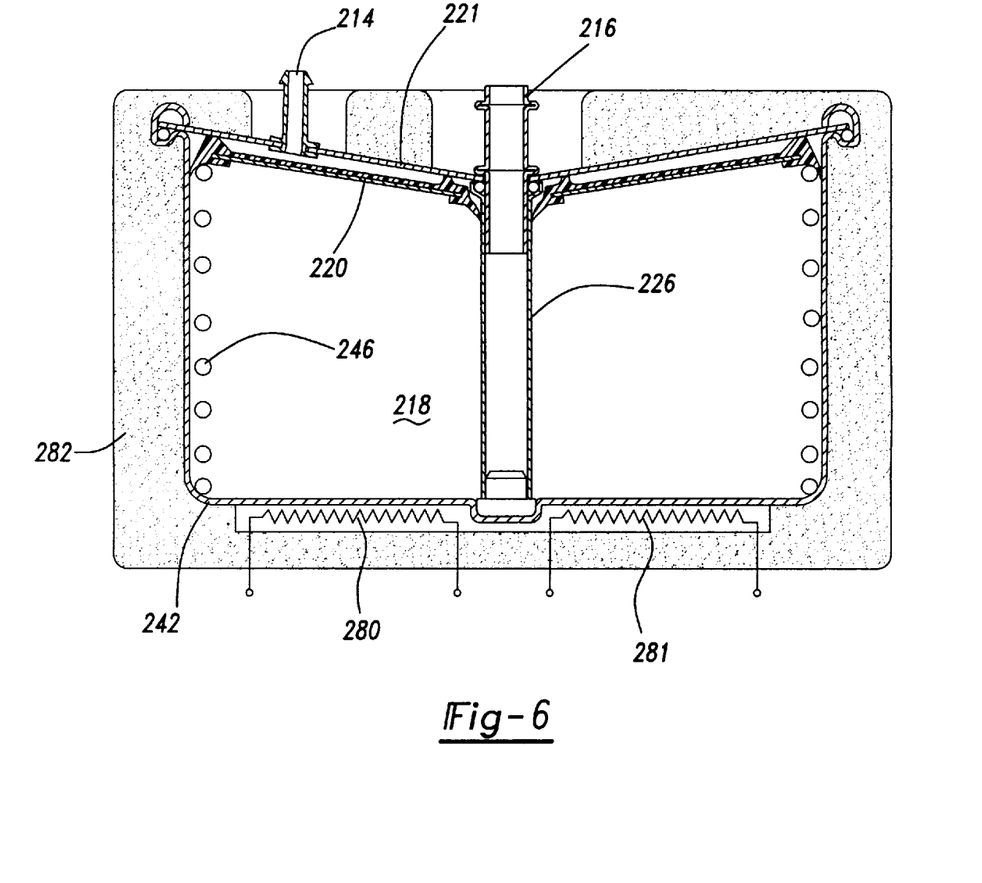
FIG. 6 is a view similar to FIG. 4 but illustrating a modification thereof.

With reference now to FIG. 6, a modification of the system of FIG. 4 there shown in which electric heating elements 280 and 281, rather than coolant from the engine coolant system, are used to heat the fluid in the chamber 218. The housing 242 is also preferably encased in insulation 282 to improve the efficiency of the system.

Preferably one heating element 280 is powered by an internal power source while the other element 281 is powered by an external power source, such as house current.

Figure 9:
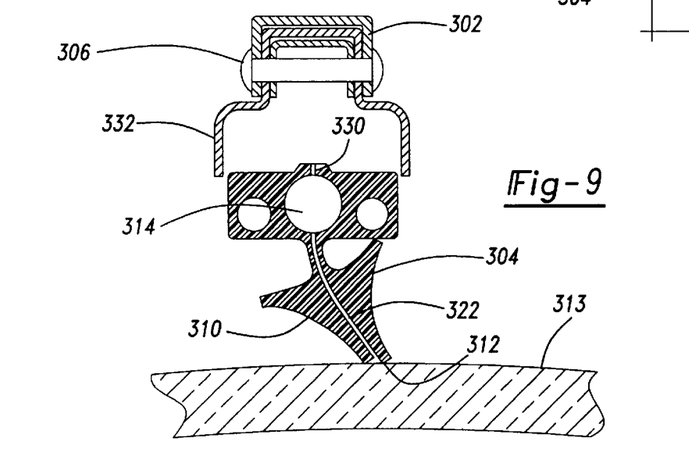
FIG. 9 is a sectional view taken along 9—9 in FIG. 8 and enlarged for clarity.

With reference now to FIGS. 8 and 9, although any nozzle 20 (FIG. 3) can be employed with the windshield wiper cleaning system of the present invention, preferably the nozzle 20 itself is contained within the wiper blade assembly 300. The wiper blade assembly 300 includes a support arm 302 which supports a flexible wiper 304 by a plurality of pivotal connections 306. These pivotal connections ensure that the wiper blade maintains contact with the curved surface windshield 313 (FIG.9) throughout its stroke.

Still referring to FIGS. 8 and 9, the wiper 304 includes a blade 310 having an end 312 which contacts the windshield 313. An elongated fluid chamber 314 (FIG. 9) is provided through the entire length of the wiper 304. One end 316 (FIG. 8) of the chamber 314 is closed while the opposite end 318 of the chamber 314 is fluidly connected by a hose 320 (FIG. 8) to the outlet port 16, 116 or 216.

Referring now particularly to FIG. 9, a plurality of elongated and longitudinally spaced slits 322 are provided which fluidly connect the fluid chamber 314 to the end 312 of the blade 310. Thus, upon pressurization of the chamber 314, fluid flows out through the slits 322 and directly against the windshield.

Preferably, the slits 322 merge into a continuous slit at the free end of the blade 310 to ensure an even flow of fluid from the blade 310 along the entire length of the blade 310. The continuous slit at the free end of the blade 310 also provides two pairs of wiping edges for the blade 310 so that when the first edge pair wears out, the second edge pair begins to take effect and wears in sequence, greatly extending the total wear life of the total blade. The slits 322 are normally closed, but open in response to fluid pressure in the chamber 314.

The provision of the continuous slit at the free end of the blade 310 thus forms four wiping surfaces, i.e. the inside and outside edge of each longitudinally extending half of the blade. In operation, the outside edges of the blade halves first contact and clean the windshield 313. As these outside edges become worn, the inside edges contact the windshield 313, thus effectively doubling the operating life of the wiper blade 310.

In order to maintain proper contact between the blade end 312 and the windshield 313, however, it is necessary that the pivot points 306 (FIG. 8) remain free of ice. To achieve this, a fluid port 330 is provided through the wiper 304 which connects the fluid chamber 314 to the end of the wiper 304 opposite from its blade end 312. Furthermore, one such port 330 is aligned with each pivot point 306. Consequently, upon pressurization of the chamber 314, fluid flows not only through the slits 322, but also through the ports 330 so that the fluid spray 332 impinges upon the various pivot points 306 of the support arm 302. In doing so, the fluid spray 332 melts any ice that may have accumulated around the pivot points 306 thus allowing free and uninhibited operation of the wiper system.

A shield 332, secured to the arm 302, is also preferably provided around each port 330. The shield 332 protects spray from the port 330 from being blown away from its associated pivot connection 306 by air flow from vehicle movement or otherwise.

From the foregoing, it can be seen that the present invention provides an improved windshield wiping system which is particularly suited for cold weather environments. Having described my invention, however, many modifications thereto will become apparent to those skilled in the art to which it pertains without deviation from the spirit of the invention as defined by the scope of the appended claims.

I claim:

1. A cleaning system for a windshield of a vehicle having an engine having a heat source comprising:

a fluid nozzle having an outlet directed towards the windshield, a source of windshield cleaning fluid, a housing defining a fluid chamber, a piston disposed in said fluid chamber and having a periphery in sealing contact with said housing, said piston dividing said fluid chamber into an inlet chamber and an outlet chamber, said piston being movable between a first position and a second position in said fluid chamber, means for resiliently urging said piston towards said first position, means for fluidly connecting said outlet chamber to said nozzle, means for transferring heat from the heat source to said outlet chamber, means for providing pressurized fluid from said source of fluid to said inlet chamber to thereby move said piston from said first position towards said second position to thereby pump fluid in said outlet chamber through said fluid connecting means to said nozzle, said piston forming an opening between said piston periphery and said housing at said second position to fluidly connect said inlet and outlet chambers.

2. The invention as defined in claim 1 and comprising a valve in said fluid connecting means and means responsive to said pressurized fluid providing means for moving said valve from a closed position to an open position.

3. The invention as defined in claim 1 wherein said fluid chamber is cylindrical in shape, said housing having a tubular stem extending axially through said housing, said piston being toroidal in shape, said piston periphery comprising an inner periphery which sealingly engages said stem and an outer periphery which sealingly engages said housing, wherein said piston opening is formed between said inner periphery and said stem.

4. The invention as defined in claim 3 wherein said resilient means comprises a helical compression spring disposed between said housing and said piston adjacent said outer periphery of said piston.

5. The invention as defined in claim 3 wherein said seal means between said inner periphery and said stem allows leakage fluid communication between said inlet chamber and said outlet chamber as said resilient means moves said piston towards said first position.

6. The invention as defined in claim 1 wherein said fluid chamber is cylindrical in shape, said housing having a tubular stem extending axially through said housing, said piston being toroidal in shape, said piston periphery comprising an inner periphery which sealingly engages said stem and an outer periphery which sealingly engages said housing, wherein said piston opening is formed between said outer periphery and said housing.

7. The invention as defined in claim 6 wherein said seal means between said outer periphery and said housing allows leakage fluid communication between said inlet chamber and said outlet chamber as said resilient means moves said piston towards said first position.

8. The invention as defined in claim 3 wherein said stem forms a portion of said fluid connecting means.

9. The invention as defined in claim 1 wherein said fluid chamber is cylindrical in shape and wherein said housing includes an annular heating chamber surrounding at least a portion of said fluid chamber, and means for fluidly connecting said heating chamber with a fluid cooling system for the engine.

10. The invention as defined in claim 1 wherein said heat source comprises an electrical heater mounted to said housing.

11. The invention as defined in claim 1 and comprising an insulating jacket surrounding at least a portion of said housing.

12. The invention as defined in claim 1 wherein said fluid connecting means has one end positioned in one end of said outlet chamber most spaced from said inlet chamber.

13. The invention as defined in claim 1 and comprising means for relieving pressure in said fluid chamber when pressure in said fluid chamber exceeds a predetermined threshold.

14. A cleaning system for a windshield of an automotive vehicle having an internal combustion engine comprising:

a fluid nozzle having an outlet directed towards the windshield, a source of windshield cleaning fluid, means for fluidly connecting said fluid source to said nozzle, means for pumping fluid from said fluid source through said fluid connecting means and to said nozzle, means fluidly connected in series with said fluid connecting means for heating said cleaning fluid, said heating means comprising an elongated, tubular electrical heating element having an interior which forms a part of said fluid connecting means so that at least a portion of fluid flow from said source to said nozzle flows through said interior of said heating element, and means for selectively electrically energizing said heating element.

15. The invention as defined in claim 14 and comprising means contained in said interior of said heating element for creating turbulence in fluid flow through said heating element.

16. The invention as defined in claim 15 wherein said means for creating turbulence comprises a plurality of axially spaced ridges along the interior of said heating element.

17. The invention as defined in claim 14 wherein said energizing means comprises means for selectively energizing said heating element in response to fluid flow through said heating element.

18. The invention as defined in claim 17 wherein said selective energizing means comprises an electric switch actuatable between an open position in which electric power is disconnected and a closed position in which electric power is connected to said heating element, a piston aligned with said switch for moving said switch between said open and closed position, said piston defining a first and second fluid chamber, and a venturi open to said fluid connecting means and one of said chambers for selectively moving said piston in response to fluid flow through said fluid passageway.

19. The invention as defined in claim 18 and comprising a fluid passageway which fluidly connects the other chamber to the interior of said heating element.

20. The invention as defined in claim 19 and further comprising means responsive to the temperature of the fluid in the interior of the heating element for reducing pressure differential across said piston whenever the temperature of the fluid in said heating element is greater than a predetermined amount.

21. The invention as defined in claim 20 wherein said pressure differential reducing means comprises a bimetallic strip.

22. The invention as defined in claim 21 and comprising a fluid port through said piston wherein said bimetallic strip closes said piston port whenever the temperature of the fluid in said heating element is less than said predetermined amount and wherein said bimetallic strip opens said piston port whenever the temperature of the fluid is greater than said predetermined amount.

23. The invention as defined in claim 14 wherein said selective electrical energizing means comprises a diaphragm operated electrical switch, one side of said diaphragm being in fluid communication with said fluid connecting means.

24. The invention as defined in claim 14 wherein a portion of said fluid connecting means extends along an outer periphery of said heating element.

* * * * *